May 12, 1936.    M. NEBEL    2,040,326
APPARATUS FOR MAKING PLUSH FABRIC
Filed April 25, 1933    11 Sheets-Sheet 1
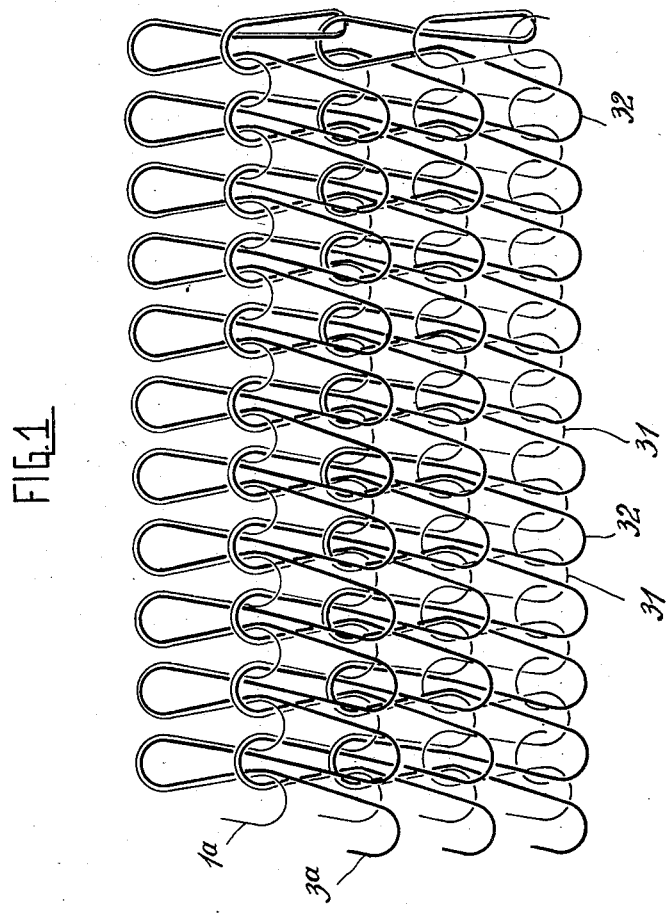
Inventor:
Max Nebel
by (signature)
Atty.

May 12, 1936.    M. NEBEL    2,040,326
APPARATUS FOR MAKING PLUSH FABRIC
Filed April 25, 1933    11 Sheets-Sheet 2
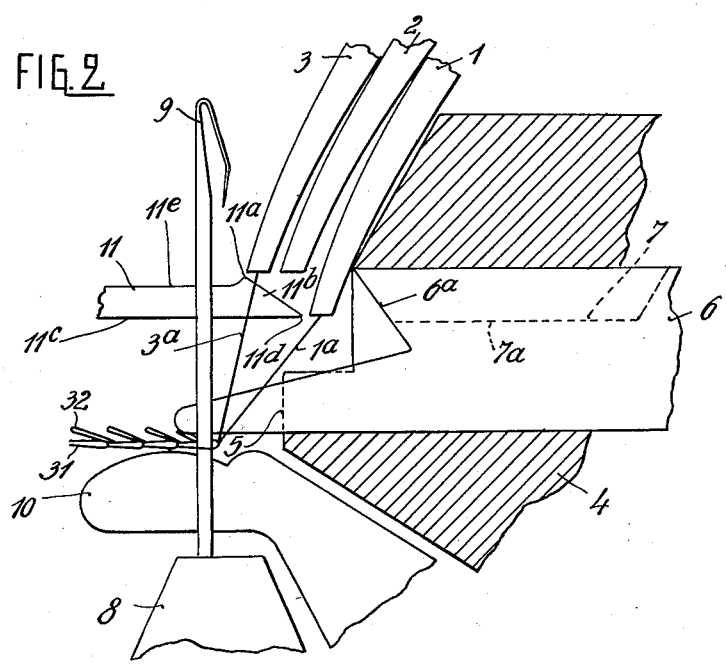
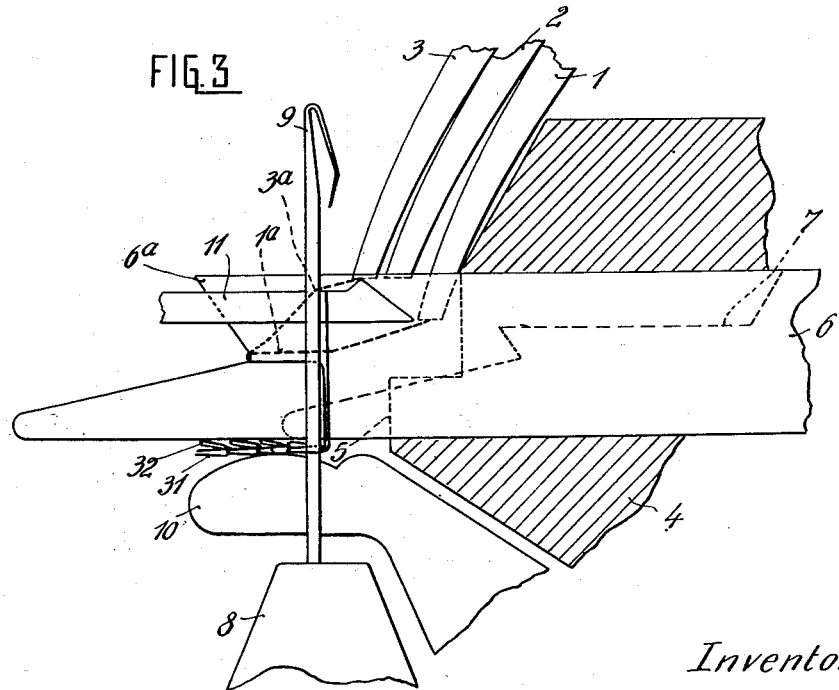
Inventor:
Max Nebel
by [signature]
Atty.

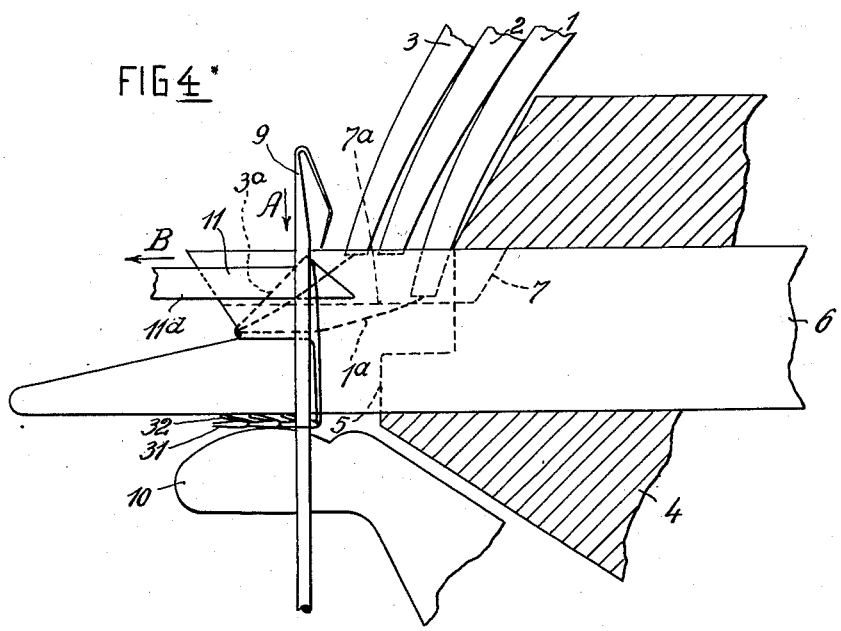
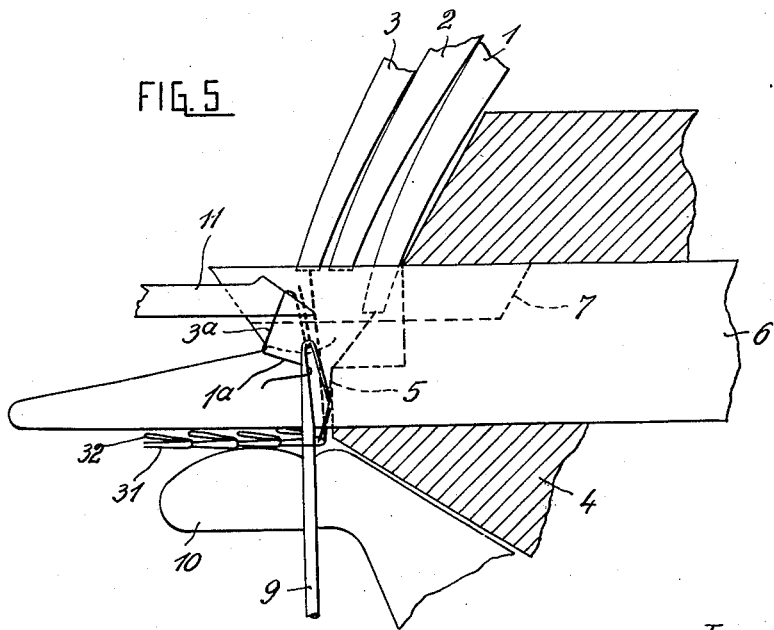

May 12, 1936.   M. NEBEL   2,040,326
APPARATUS FOR MAKING PLUSH FABRIC
Filed April 25, 1933   11 Sheets-Sheet 4
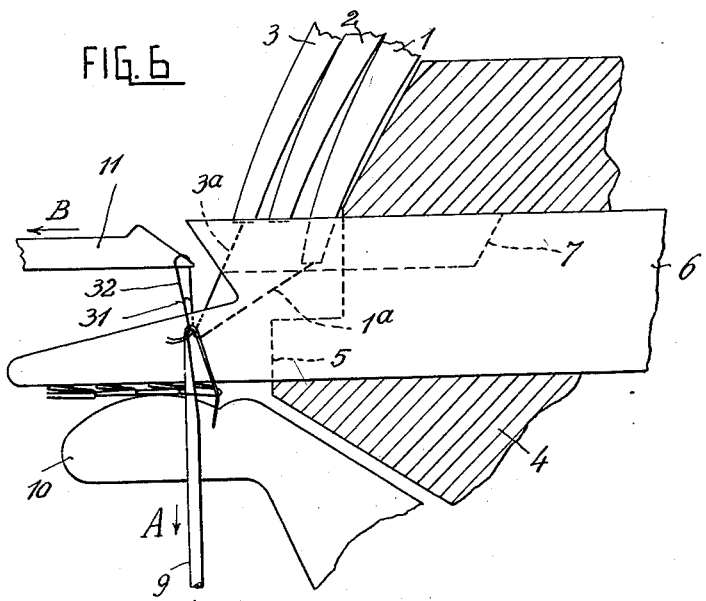
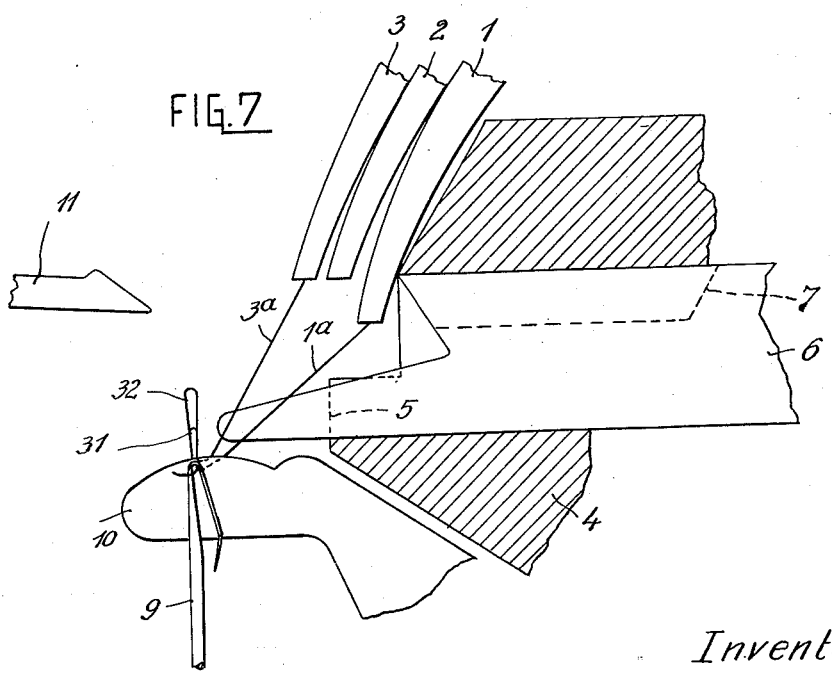
Inventor:
Max Nebel
by Karl Richter
Atty.

May 12, 1936. M. NEBEL 2,040,326
APPARATUS FOR MAKING PLUSH FABRIC
Filed April 25, 1933 11 Sheets-Sheet 5
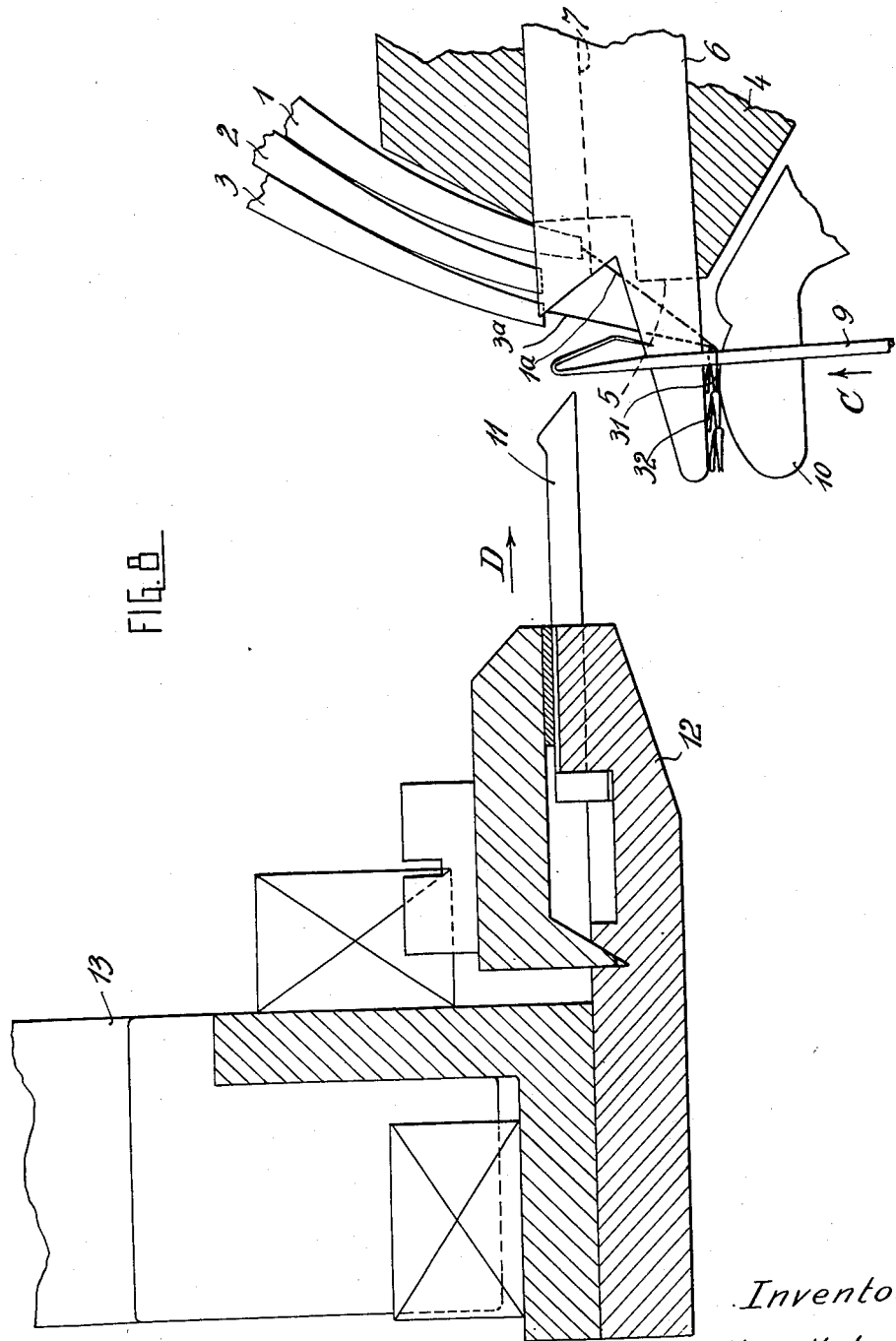
Inventor:
Max Nebel
by Karl Richardson
Atty.

May 12, 1936. M. NEBEL 2,040,326
APPARATUS FOR MAKING PLUSH FABRIC
Filed April 25, 1933 11 Sheets-Sheet 6
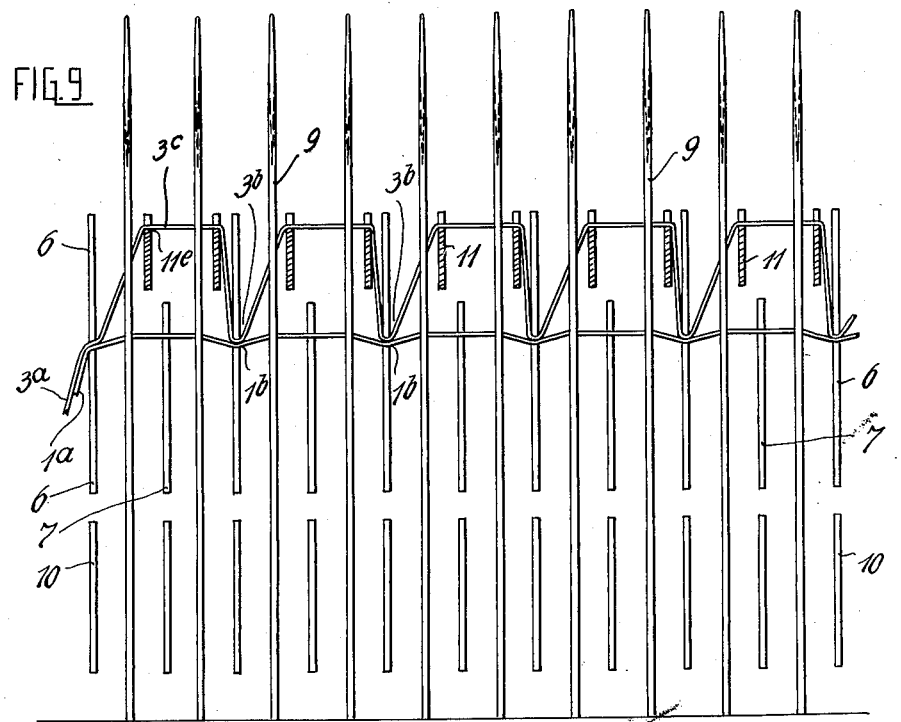
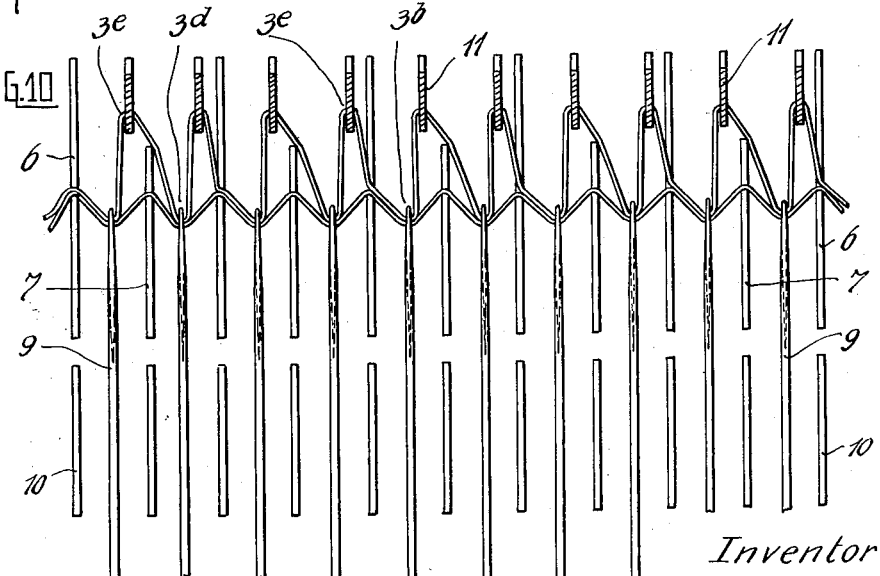
Inventor:
Max Nebel

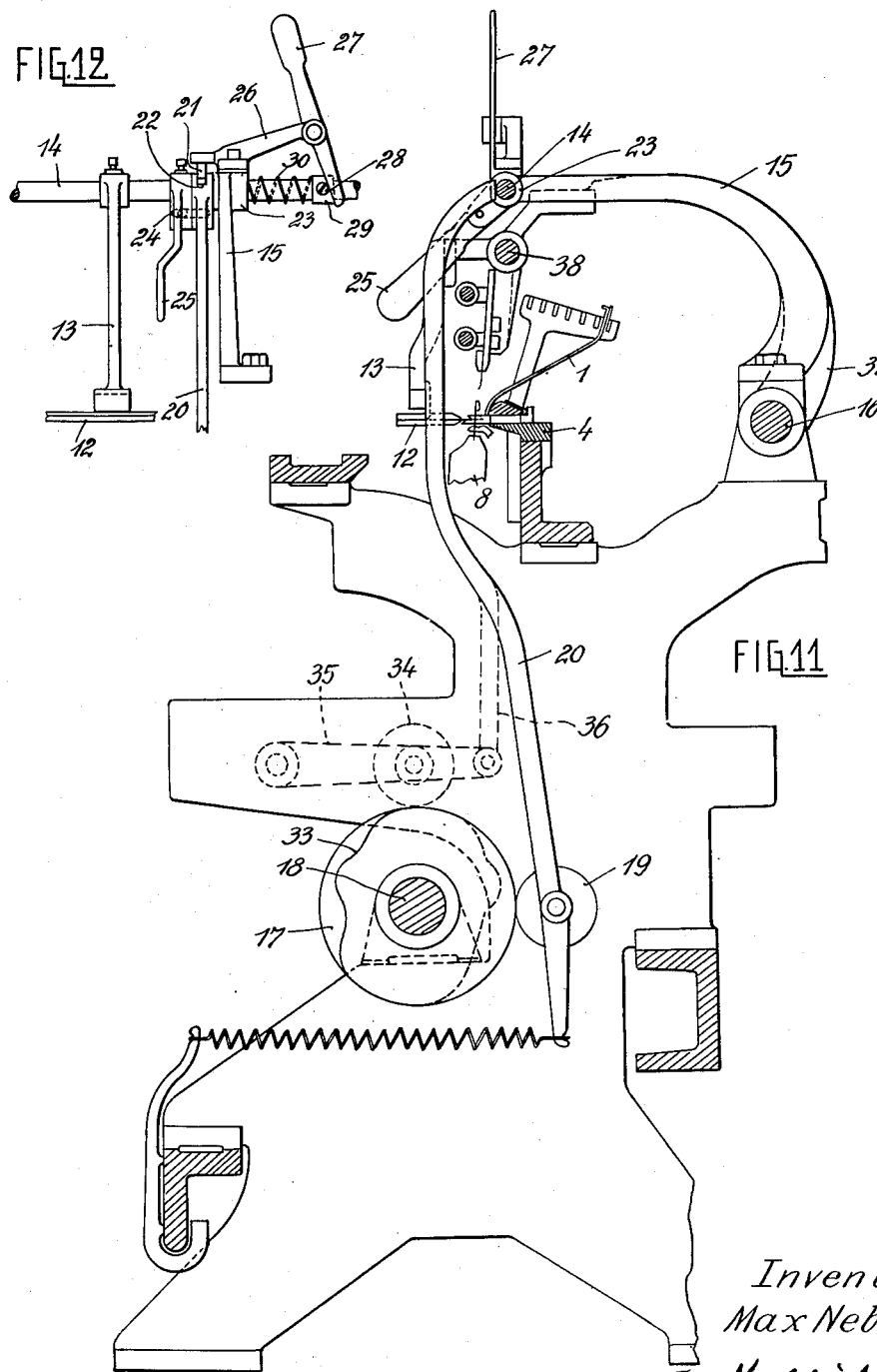

May 12, 1936.  M. NEBEL  2,040,326
APPARATUS FOR MAKING PLUSH FABRIC
Filed April 25, 1933   11 Sheets-Sheet 8
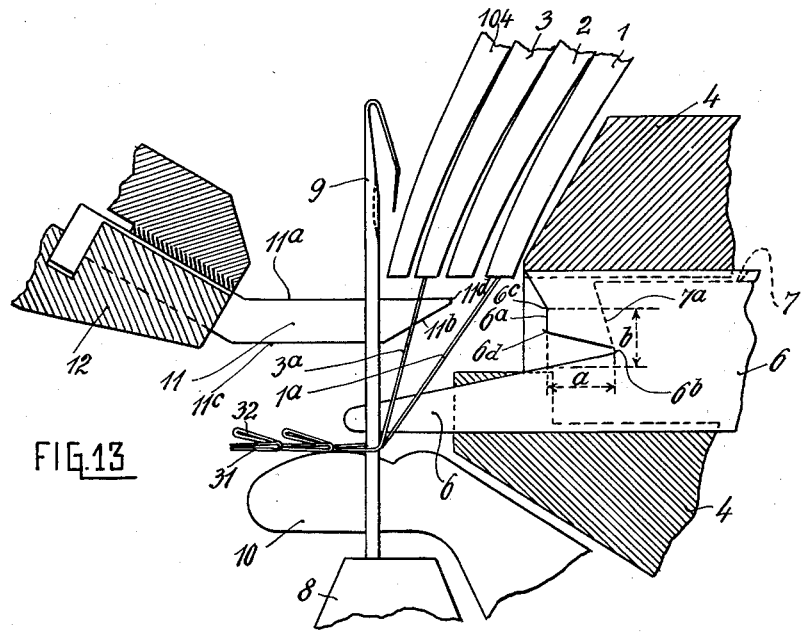
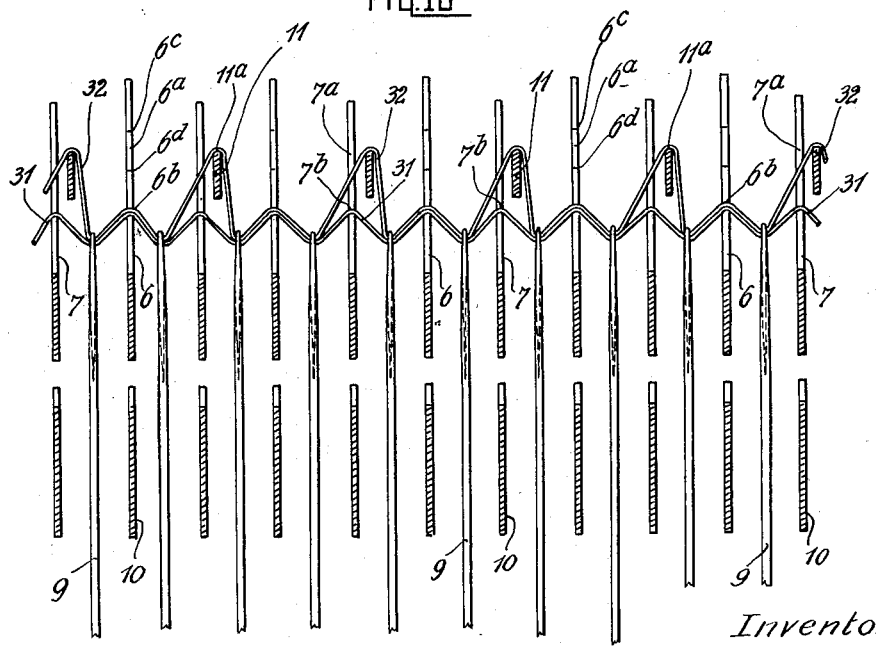
Inventor:
Max Nebel
by Karlekirhauer
Atty.

May 12, 1936.   M. NEBEL   2,040,326
APPARATUS FOR MAKING PLUSH FABRIC
Filed April 25, 1933    11 Sheets-Sheet 9
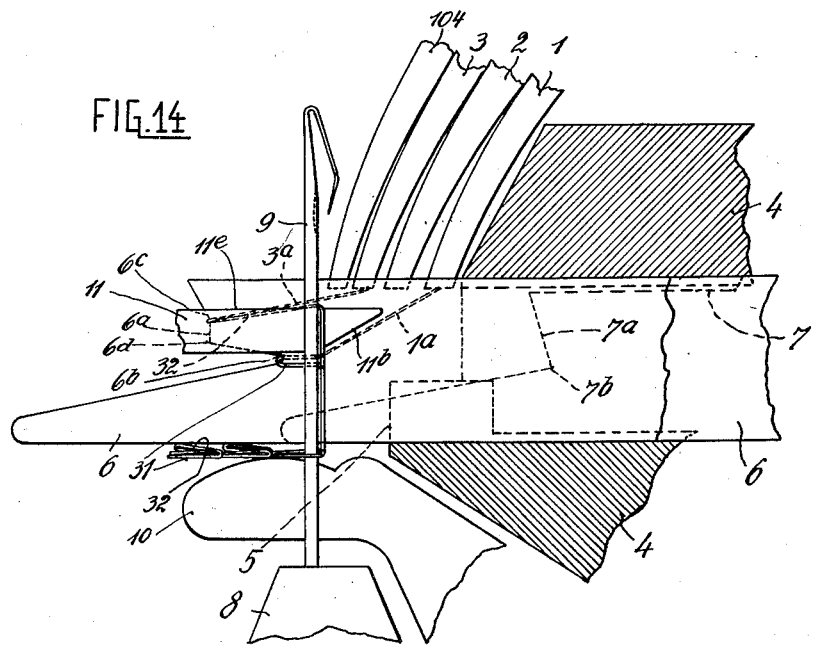
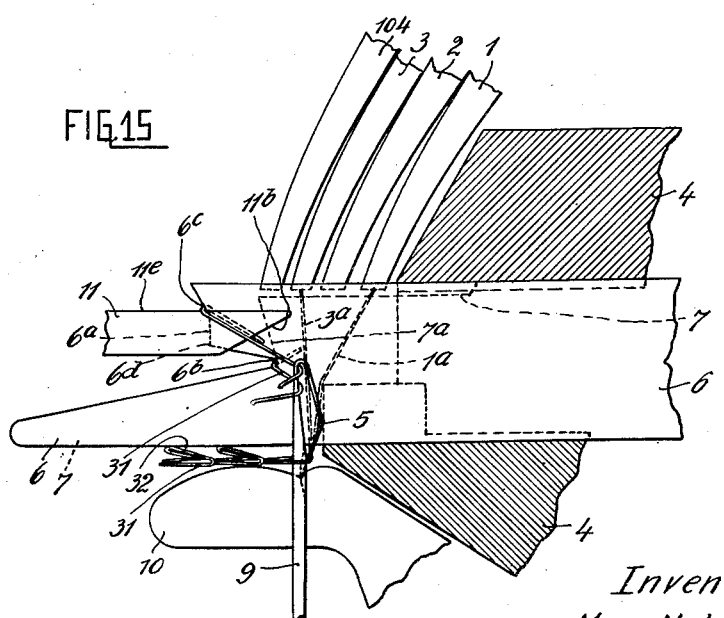
Inventor:
Max Nebel
By [signature]
Atty.

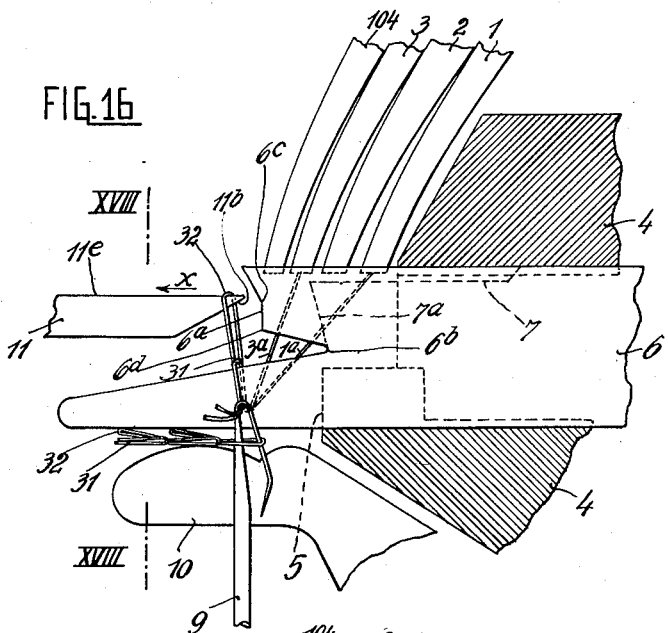
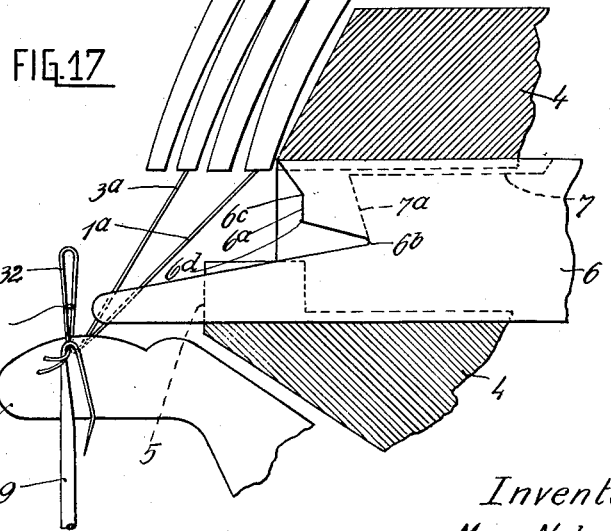

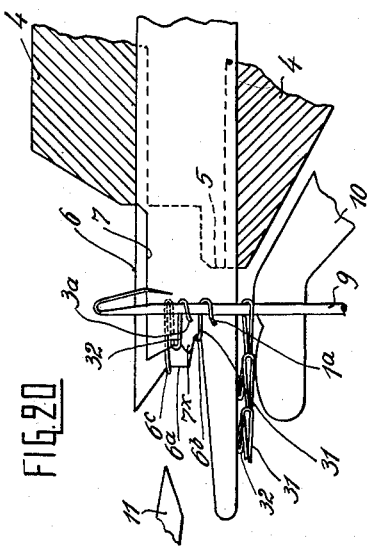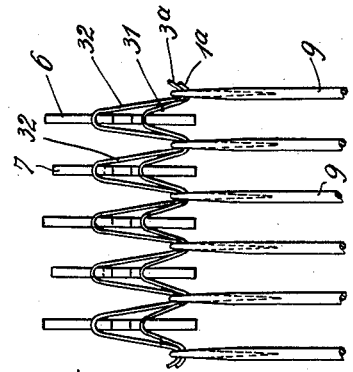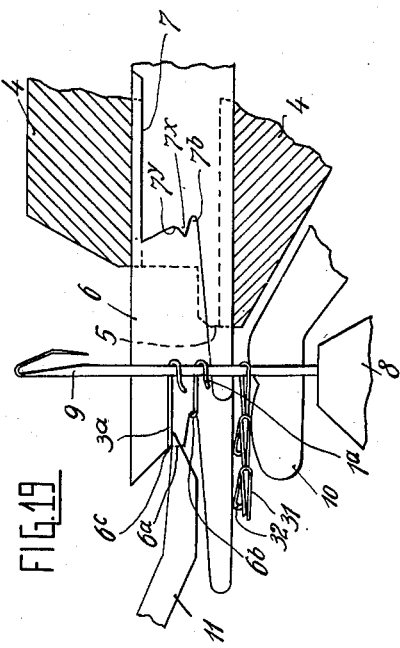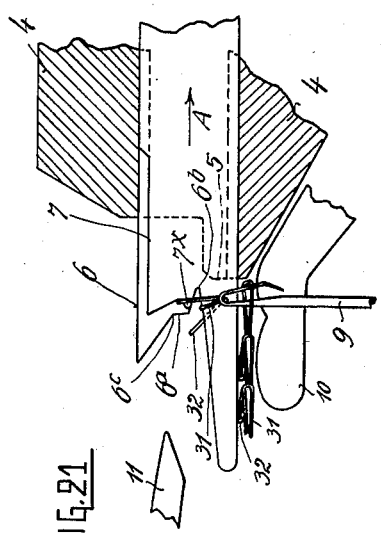

Patented May 12, 1936

2,040,326

UNITED STATES PATENT OFFICE 2,040,326

APPARATUS FOR MAKING PLUSH FABRIC

Max Nebel, Chemnitz, Germany

Application April 25, 1933, Serial No. 667,795
In Germany May 2, 1932

8 Claims. (Cl. 66—91)

My invention relates to improvements in flat knitting machines for knitting plush fabrics and more particularly loop-plush fabrics. Plush fabrics knitted on flat knitting machines have regular selvedges, i. e. selvedges with closed loops, and my novel machine knits a fabric which also has regular selvedges.

However, while the old loop-plush fabrics have a plush loop above every second sinker loop only, my novel fabric has a plush loop above every sinker loop.

In the old fabric in which a free sinker loop of the ground fabric is interpolated between each two plush loops, the plush loops are comparatively far apart and the plush lacks density and strength. The absence of the plush loops above every second sinker loop in the old fabric is particularly undesirable in stockings, the principal production of the flat knitting machine. In stockings having a plush backing, for instance, at the foot portion, plush as made heretofore on flat knitting machines looses its resiliency under the weight of the foot, as it is readily pressed down flat, the individual loops being not in such close proximity as to support each other. Apart from the loss of resiliency, the old fabric also loses its properties as a bad heat conductor.

The drawbacks of plush fabrics made heretofore on flat knitting machines are eliminated according to my invention by providing a plush loop for every sinker loop.

In the knitting of such a fabric on flat knitting machines, the ground fabric which may be plain, reinforced or plated fabric, is obtained in the usual manner by sinking its thread or threads from the thread guides over the needles from the jack sinkers, and dividing them into loops of the desired length by the dividing sinkers. While the ground threads are sunk in this usual manner, the plush threads are handled by separators of a separator comb having one separator per pair of jack and dividing sinkers on which separators they are placed by the thread guides. The separators of the comb, as described in my copending application for patent of the United States, Serial No. 646,592, filed December 10, 1932, for "Flat knitting machine", are arranged to enter between the needles and move in opposite direction to the sinkers. During the sinking of a plush loop the plush thread from the thread guide is separated by the corresponding separator substantially at right angles to the direction in which the sinkers move. In a flat knitting machine, this direction is horizontal and consequently the plush threads are divided in downward direction while the ground thread which has been sunk in downward direction by the jack sinkers, is distributed by the needles moving into pressing position, which needles, upon the further movement for landing and knocking over, pull the distributed plush loops from the tools which have entered between the needles.

The most important improvement achieved by my invention is the fact that it is not necessary to equip a flat knitting machine with extra plush sinkers but that the plush is knitted by the usual jack and dividing sinkers. In this manner, it is possible to knit certain portions of a stocking with plush backings without exchanging sinkers and in a continuous operation. Thus, the toe, the heel and the sole of a stocking can be backed with plush without exchanging sinkers when changing from the backed to the normal plain, reinforced or plated fabric. I may also knit a portion of a course plain and its other portion with plush loops.

The section of the aforesaid separators is so thin that when they enter between the needles to receive the thread from one of the thread guides, they can be positioned between the needles when the jack and dividing sinkers have formed loops.

Still another advantage of my invention is the possibility of knitting patterns on the fabric by means of plush loops. This is effected by adjustably mounting the separators of the comb in the bar which supports them. By these means, certain separators can be retracted so as not to enter between the sinkers like the other separators. Where separators have been retracted, plush loops are not formed and the fabric is patterned.

In the drawings affixed to this specification and forming part thereof a fabric and various combinations of jack and dividing sinkers and dividing tools embodying my invention, and a knitting machine for making the same are illustrated diagrammatically by way of example.

In the drawings

Fig. 1 is a diagram of the fabric.

Figs. 2 to 7 are diagrams showing the jack and dividing sinkers, the needles and one of the separators in various relative positions, as required for the several stages of a complete operation, in which the threads are sunk and divided in downward direction, Fig. 8 is a sectional elevation showing the parts illustrated in Figs. 2 to 7, and the bar in which the separators of the comb are adjustably mounted, Figs. 9 and 10 are sections on the line IX—IX in Fig. 3, showing, respectively, the position of the parts after sinking and before dividing, and after dividing the ground threads and the plush threads, Fig. 11 is a sectional elevation of a flat knitting machine equipped with sinkers and separators according to my invention, Fig. 12 is a detail of a machine, viewed from the left in Fig. 11, Figs. 13 to 17 are diagrams showing the jack and dividing sinkers, the needles and one of the separators in various relative positions, for a machine in which the threads are sunk in forward, and divided in downward direction, and the separators are crooked, Fig. 18 is a section on the line XVIII—XVIII in Fig. 16, Figs. 19 to 21 are diagrams showing the jack and dividing sinkers, the needles and one of the separators, of a somewhat modified machine for performing the operation illustrated in Figs. 13 to 17, and Fig. 22 is a front elevation of the jack and dividing sinkers, needles and ground and plush threads shown in Fig. 21.

Referring now to the drawings, and first to Fig. 1, the fabric which is made on a flat knitting machine, consists of the ground thread 1a (light lines) and the plush thread 3a (heavy lines) and has a regular selvedge at the right. A similar selvedge is obviously formed at the left but not shown. Sinker loops 31 are formed from the ground thread 1a, and plush loops 32 are formed from the plush thread 3a above the sinker loops.

Referring now to Figs. 2 to 7, the ground thread 1a is supplied by a thread guide 1, and the plush thread 3a by a thread guide 3. The thread guide 2 is provided for a third thread which, however, is not used for the fabric shown in Fig. 1. In the sinker bar 4, with the presser edge 5, jack sinkers 6 and the dividing sinkers 7 are arranged in the usual manner. The needles 9 are secured to the needle bar 8 and move between the blades 10 of the knocking-over comb. 11 are the separators of the comb which are arranged to enter between the needles 9. The separators 11 which have a straight lower edge 11c, a straight upper edge 11e, a hook 11a projecting from the upper edge, and an inclined face 11b extending from the hook 11a to a point 11d, are mounted to be adjusted in grooves of a separator bar 12, Fig. 8, at the lower end of an arm 13 to which rocking movement is imparted by the means to be described with reference to Figs. 12 and 13. The object of mounting the separators 11 adjustably in the bar is to obtain a plush pattern by selectively retracting certain separators, as explained above.

In the initial position of the parts, Fig. 2, the separator 11 is below the thread guide 3 with its front end and the plush thread 3a is laid on the inclined face 11b of the separator 11. The lower end of the thread guide 3 is just above the hook 11a, and the lower edge 11c of the separator is just above the upper edge 7a of the dividing sinker 7, and at the level of the lower end of the thread guide 1 for the ground thread. This arrangement prevents unintentional sinking or dividing of the ground thread, or ground threads, 1a as plush loops. The separators 11 in this manner act as separators for the ground and plush threads 1a and 3a.

In Fig. 3, the jack sinker 6 advances and forms a loop from the ground thread 1a, and at the same time forms a plush loop from the plush thread 3a. The upper inclined edge 6a of the jack sinker 6 engages not only the ground thread 1a but also the plush thread 3a and transfers the plush thread 3a from the hook 11a to the upper edge 11e of the separator 11. The open end of the plush loop is supported on the separator 11 and the loop is held against displacement on the upper edge 11e of the separator 11 by the shank of the needle 9.

The dividing sinker 7 now advances, Fig. 4, and distributes the loops of the ground thread 1a. The operation of the dividing sinker 7 does not interfere with the loops of the plush thread 3a. This will appear without further explanation, from Fig. 9, which shows that the upper edges 7a of the dividing sinkers 7 are below the lower edges 11c of the separators 11, so that the dividing sinkers 7 never engage the plush thread. It will appear from Fig. 3 that as the jack sinker 6 advances and pulls out the loop from the plush thread 3a, the apex of the loop slides down along the inclined edge 6a of the jack sinker 6 until it is at the bottom of the jack-sinker throat together with the ground-thread loop, as also shown in Fig. 9. It will also appear that the plush loop is drawn out longer than the ground-thread loop because it is drawn from the top of the jack sinker where its open end is retained by the needle 9. By sinking the plush loops in downward direction as described, the required greater length of the plush loops is obtained with jack sinkers of normal design which sink the ground thread loops in horizontal direction in the usual way.

While after distributing, Fig. 4, the needles 9 move downwards toward the press in the direction A, the separators 11 start for a slight movement in the direction B, i. e., in the direction of the sinking and dividing movement of the sinkers 6, 7. The slight movement B serves for reliably placing the plush thread 3a on the separator 11 below the point of the needle 9 by means of the hook 11a. The head of the needle moving toward the press engages the portions of the plush thread 3a which have not yet been formed into a loop, i. e., those portions which are in front of, or above, the dividing sinkers 7, and distributes the loops on the separators 11, as shown in Figs. 4, 5 and 10. During this distribution, the plush loops have been pulled onto the inclined face 11b of the separator 11, as shown in Fig. 5, so that any excessive stresses in the thread are equalized. The dividing operation is also effected in downward direction, as shown in Fig. 5. The plush thread is retained at the point where it bears on one of the sinkers (the jack or the dividing sinker) or separators 11, until the corresponding needle 9 has completed what may be termed the "dividing portion" of its downward movement toward the press 5. The point where the plush thread 3a is retained, may be positioned on the upper edge of the plush hook 7x of a dividing sinker, Fig. 19, or it may be positioned on the inclined face 11b, or on the parallel upper edge 11e, of a separator 11. By thus dividing in downward direction, the distinct lengths of the loops from the ground thread 1a and the plush thread 3a are made up for.

With the beginning of the landing movement of the needles, as shown in Fig. 6, the separators 11 continue their interrupted movement in the direction B, preferably at the same velocity as the needles. The inclination of the face 11b is so selected that stress in the loops is eliminated. The loops are preferably released by the point 11d at the moment the needles 9 arrive in their knocking-over position.

Fig. 7 shows the position of the parts after knocking-over. The separators 11 have released the plush loops 32 and have moved into their final rearward position.

Fig. 8 shows the needles 9 at the moment they are about to return into their initial position in the direction C while the separators 11 are moved toward their forward final or active position by their bar 13 in the direction D. The jack and dividing sinkers 6 and 7 are shown in their initial positions, as in Fig. 7.

The level at which the separators 11 are arranged, determines the length of the plush loops 32.

Fig. 9 shows the position of the ground thread 1a and of the plush thread 3a, as viewed from the left in Fig. 3, section IX—IX. The operating stage shown in Fig. 9 corresponds to that of Fig. 3. The needles 9 are still in elevated position just before they move down toward the press and distribute the plush loops 3b of the plush thread 3a, whose apices are in the throats of the jack sinkers 6 together with the sinker loops 1b of the ground thread 1a.

The section in Fig. 10 is the same as that in Fig. 9 but the position of the parts corresponds to Fig. 5. The ground thread 1a has been distributed by the dividing sinkers 7 and the plush thread has been distributed by the needles 9. The descending needles have engaged the portion 3c of the plush thread 3a which has not yet been formed into a plush loop and is on the upper edge 11e of the separator 11 between the loops 3b (Fig. 9) which have been sunk in downward direction by the upper inclined edge 6a of the jack-sinker throat, and pulled down the portion 3c into a loop 3d. The plush loops 3b which upon the return movement of the jack sinker 6, Fig. 6, have been released by the throat of the jack sinker, are engaged by the corresponding needle 9 and held as loops, as shown in Fig. 10. The free apices of the plush loops 3b formed by the plush thread 3a are still on the inclined face 11b of the separator 11 and are going, as also shown in Fig. 6, to slide down from the face with the descending and advancing needles, and are released by the face when the needles move into knocking-over position. They are now at the back of the fabric as plush loops 32.

As mentioned, the separators 11 are mounted adjustably in the bar 12 of the separator comb for knitting a pattern by retracting certain separators 11.

The old fabric, with a plush loop only for every second loop of ground thread, can be made on the machine described by placing separators 11 only in front of every dividing sinker 7, i. e. providing twice the normal pitch for the separators.

It is understood that the application of my method is by no means limited to the manufacture of the fabric shown in Fig. 1 but may be applied to great variety of plush fabrics, with the separators 11 pitched at the pitch of the needles 9, or at two or more times the needle pitch, and the separators may be adjustable or fixed in the bar 12 of the separator comb. For instance, with a bar 12 whose separators 11 are at twice the needle pitch, the bar can be displaced laterally for one pitch after the knitting of every course, and plush is obtained in which the plush loops in one course may be above each second sinker loop, and in the next course the plush loops are also above every second sinker loop, but staggered, so that the plush loops in this course are in the interstices of the preceding course, etc. It is also possible to omit entire courses of plush loops uniformly or corresponding to any desired, more or less irregular pattern, which is effected by cutting out the separator comb automatically for knitting a row without plush loops.

Referring now to Figs. 11 and 12, the frame of the flat knitting machine is designed as usual and will not be described in detail. The supporting shaft 16 for the narrowing machine is mounted to oscillate in bearings of the frame, 37 being arms on the shaft 16 and 38 being the narrowing shaft at the free ends of the arms 37. The narrowing machine is operated by pitmen 36, a cam 33 on a cam shaft 18, a roller 34 which bears on the cam 33, and a rocking arm 35. The bar 4 for the jack and dividing sinkers is mounted on a transverse stay of the frame.

The bar 12 of the separator comb in which the separators 11 are mounted to be adjusted (or fixed, if patterning is not desired), is arranged at the lower end of the arm 13 which arm is secured on a shaft 14. The shaft 14 is mounted to oscillate and to slide axially in arms 15. It is understood that several arms 13 and 15 are required in view of the length of the machine. The arms 15 may be connected to the frame of the machine by screws, as shown. A pitman 20 is mounted to turn freely on the shaft 14 but held against axial displacement by a pin 21 which is secured on one of the arms 15. The pin 21, Fig. 12, engages in a groove 22 in the boss of the pitman 20. The pitman 20 is operated by a cam 17 on the shaft 18 through a roller 19.

Clutching means for connecting the pitman 20 to the shaft 14 comprises a pin 24 in a handle 25 which is secured on the shaft 14 at one side of the bearing for the pitman 20. The shaft 14 which, as mentioned, is mounted to slide axially in the arms 15, is connected to a handle 27 mounted in a bracket 26 on one of the arms 15. The lower end of the handle 27 engages a pin 28 on a sleeve 29 on the shaft 14. A spring 30 is placed on the shaft 14, with one end bearing against the sleeve 29, and the other end bearing against an abutment 23. The spring 30 tends to throw in the clutching pin 24 and the clutch is thrown out when the handle 27 is operated. The bar 12 can be rocked in upward direction by the handle 25 which is keyed on the shaft 14, after the clutch has been thrown out.

The plush loops 32 can also be made by sinking in forward direction and dividing in downward direction if it is desired to knit plush backing having a plush loop above every second sinker loop, as described, with the same alternating arrangement of plush and sinker loops in the wales. By this method, a checkerwork pattern is formed on the back of the fabric by the plush loops. This eliminates the formation of stripes on the face of the fabric, the plush is less thick than the plush in which every sinker loop has its plush loop, and the fabric is entirely homogeneous as regards elasticity and stretch.

In the manufacture of this type of plush on flat knitting machines, the plush loops in one course are formed by the jack sinkers while the plush thread is interlocked as a dividing-sinker loop by the dividing sinkers, while in the next course the plush loops are formed by the dividing sinkers and the jack sinkers in this course work the plush thread into the sinker loop of the ground fabric so that the ground fabric is double-threaded. This alternation in the knitting of the plush loops from the dividing-sinker loops and from the jack-sinker loops of the plush thread is performed regularly from course to course.

Referring now to Figs. 13 to 17, the several parts are substantially the same as described with reference to Figs. 2 to 10, but here, four thread guides 1, 2, 3 and 104 are arranged in a row, and three more thread guides are arranged behind the thread guides 1, 2 and 3 and not visible. The separators 11 are crooked and are not mounted to be displaced in their bar 12. The bar 12 is mounted at the end of arms 13, as described with reference to Figs. 11 and 12.

The separators 11 are without the hooks 11a and their upper and lower edges 11e and 11c are straight and parallel to each other. The face 11b is inclined in upward and not in downward direction.

The jack sinkers 6 have throats at 6b. The upper edge of the throat portion is inclined as far as 6d, from 6d to 6c it has a vertical portion 6a, and at the upper end of this vertical portion it has an inclined face. 6b is the ground-thread throat of the jack sinker 6 which is arranged below the plush-thread throat 6c for a distance b and is pitched to the rear of the plush throat for a distance a which corresponds to the amount for which the plush loop is to be longer than the ground-thread loop. The upper edge 11e of the separator 11 is positioned a little higher than the plush throat 6c in the active position of the separator. The dividing sinkers 7 are single-throated and of the usual type. Preferably, their throats 7a are steeper than normal. In the position illustrated in Fig. 13, the separators 11 on the bar 12 are positioned between the needles 9 and somewhat laterally with respect to the jack sinkers 6, so that they will not interfere with the forwardly moving jack sinkers 7. The point of the separator 11 is below the thread guides 1, 2, 3 as shown in Fig. 13, and between the thread guides 1 and 3, so that the ground thread 1a can be placed in the ground-thread throat 6b of the jack sinker without resistance while the plush thread 3a is placed on the upper edge 11e of the tool by the thread guide 3. This, in addition to fulfilling the object aimed at, also effects a reliable separation of the ground and plush threads, as described above. When the sinkers advance, the ground-thread loop is sunk by the throat 6b of the jack sinker 6 while the plush loop is sunk by the throat 6c above the separator 11.

Fig. 14 shows the position of the parts after sinking. The sinker loop of the ground thread 1a is in the throat 6b of the jack sinker 6. Downward slipping of the loop on the vertical portion 6a is prevented by the separator 11.

The loop is still restrained when the needle 9 descends toward the press, as shown in Fig. 15. The dividing sinkers 7 which have advanced in the meantime, influence the plush thread 3a only in so far that they distribute a little more thread than for the ground thread 1a.

When the sinkers 6, 7 begin to move back toward the initial position, Fig. 16, while the needles move away from the press downwards as far as their knocking-over position, the separators 11 are retracted in the direction X away from the jack sinkers. The relative velocity is such that at the moment the loops of the ground thread 1a are taut on the beak of the sinker, the plush loop slides off the point of the separator 11. In order to prevent overtautness of the loops on the separator 11, the upper edge 11e of the separator 11 must be above the upper edge of the sinker beak for a distance which is equal to the amount for which the plush loops are longer than the ground-thread loops. It is obvious that in view of this the most favorable position of the shaft 14 is such that the separators when moving from between the needles 9 in the direction X, move approximately in the direction of the inclined upper edge of the sinker beaks. Now, since both the ground-thread and the plush loops are taut on the separator 11 until they are knocked over, Figs. 16 and 17, the loops cannot turn over each other and the fabric is only plated.

During knocking-over, the separators 11 are in the inactive position, Fig. 17. A fresh course is now started and the bar 12 with the separators 11 is moved aside for one pitch, so that upon its return into the active position, Fig. 13, it is not in front of the jack sinkers 6 but in front of the dividing sinkers 7. Sinking is effected as in the preceding operation and the threads are placed as in Fig. 14, only the separator 11 is not at the side of the jack sinker 6 but of the dividing sinker 7 which has not yet advanced. The separators all the same prevent downward slipping of the plush loops along the edge 6a of the throat 6c, notwithstanding their being moved aside from the jack sinkers for one pitch. The preceding dividing sinkers 7, as in the preceding operation, distribute only a little more plush thread 3a than ground thread 1a. The distribution of the plush threads 3a is more similar to that of the ground threads 1a, the steeper the edge 7a of the dividing sinkers 7.

When the needles 9 descend into pressing position, Fig. 15, the plush loop which has been sunk by the jack sinkers, looses its hold on the edge 6a and delivers its excess thread to the separator 11 which is in front of the dividing sinkers 7. The descending needles 9 now distribute afresh the plush thread 3a. The long ground-thread loops distributed by the jack sinkers 6 have shrunk to the extent to which the corresponding needle consumes thread in order to hang the loops tautly on the beaks of the jack sinkers while the short plush loops have been lengthened by the separators 11 in front of the dividing sinkers 7. The position of the threads corresponds to that of Fig. 16. Hereupon, the separators 11 return into their inactive position, Fig. 17. Before the formation of the next course, they move laterally for another pitch, back into the position corresponding to the second preceding course so that in the course which is going to be knitted jack-sinker plush loops are again formed.

The position of the threads shown in Fig. 18 shows the distribution of the plush loops which have been sunk by the jack sinkers and by the descending needles 9.

It will be understood that the thread whose thread guide moves past the upper edge 11e of the separator 11, is worked as a plush loop either on the jack or on the dividing sinker. In Figs. 13 and 14, the threads supplied by the thread guides 2, 3 and 104, and by the two invisible thread guides at the rear of 2 and 3, are all worked into plush loops, with the staggering according to the invention. For the ground fabric, only the thread guide 1 and the thread guide behind it are available. If it is desired to have more thread guides available for the ground thread, the separators 11 are, for instance, rocked toward the sinkers 6, 7 only so far that their points 11d are below the gap between the thread guides 2 and 3. In this case, only the threads from the thread guides 3 and 4, and from the invisible thread guide at the rear of 3, are worked into plush loops. In this manner, plated stockings may be reinforced in addition to the plush backing at those points where they are usually reinforced. By the machine according to my invention, exclusive plating is also provided for while the machine still conserves the important improvement according to the invention, i. e., backing at the same speed of the machine at which plain fabric is knitted.

Another possibility of knitting plush will now be described with reference to Figs. 19 to 22. According to this modification, the plush loops are distributed partly by the movements of specially designed dividing sinkers, and partly by the movements of the needles. The advantage of the modification is that with the exception of the specially designed dividing sinkers, no extra tools and appliances are required in flat knitting machines.

The separators 11 have been shown in Figs. 19 to 22 since they may be provided as safety means but they may as well be dispensed with.

In Figs. 19 to 22, the thread guides 1 etc. have been omitted but otherwise the parts are designed as described. The jack sinkers 6 are of the old type known as plush sinkers, with a ground-thread throat 6b, as described, and a plush throat 6c.

The dividing sinkers have a plush hook 7x above a ground-thread throat 7b, and a forwardly inclined edge 7y above the plush hook.

The ground thread 1a is sunk by the lower throat 6b and the plush thread 3a is sunk by the upper plush throat 6c of the jack sinker 6. As the plush throat is far in advance of the ground-thread throat, more thread is sunk from the plush thread 3a, as shown in Fig. 19. The jack sinkers 6 now advance together and the final position of their movement is shown in Fig. 19. The jack sinkers 6 move back for a distance corresponding to the thread distributed by the dividing sinkers 7. The sunk loops of the ground thread 1a are completely distributed by the lower throat 7b of the dividing sinkers so that the jack-sinker loops are as long as the dividing-sinker loops. The sunk plush-thread loops, however, are distributed by the dividing sinkers only to the same extent as the ground thread so that the jack-sinker loops of the plush thread 3a are substantially longer than its dividing-sinker loops. Preferably, the dividing-sinker loops of the plush thread 3a are distributed a little longer than the loops of the ground thread, because it has been found that longer loops, i. e. the longer sunk loops of the plush thread 3a, must always be distributed at a little more tension than loops which have been sunk shorter. This somewhat stronger distribution is effected by placing the upper throat 7y of the dividing sinkers a little in advance of the ground-thread throat 7b. After this distribution, the needles 9 descend toward the press whereupon follows the delivering movement and at the same time the sinkers are moved back in the direction of A, Fig. 21. While the needles 9 descend in this manner, another portion of the plush thread is distributed on the upper edge of the hook 7x.

The dividing-sinker loop of the plush thread 3a which has become much longer by the downward movement of the needles, than the corresponding loop which has been distributed only by the dividing sinker 7 in conformity with Fig. 19, and whose length is approximately equal to that of the jack-sinker loop, is compensated completely into a jack-sinker loop by the return movement of the jack sinker 6 in the direction A, Fig. 21, by the edge of the hook 7x, until the jack-sinker loops are as long as the dividing-sinker loops, and both loops are twice as long as the loop of the ground thread 1a.

The plush loops are distributed in three stages: Firstly, the distribution which is equal to, or somewhat in excess of, the distribution of the ground-thread loops by the normal distributing movement of the dividing sinkers, secondly, the further distribution by the descent of the needles, and thirdly, the complete distribution by the return movement of the jack and dividing sinkers.

Patterning is only feasible by providing jack sinkers or dividing sinkers with plush hooks instead of normal jack and dividing sinkers.

The threads can be placed in the corresponding throats of the jack sinkers in any usual manner, for instance, by raising the ground-thread guide, which is positioned so low that its thread is delivered at the level of the level of the ground-thread throat, beyond reach of the dividing sinkers 7 before the beginning of the distribution.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a flat knitting machine, a set of frame needles, a set of jack sinkers, a set of dividing sinkers, thread guides, separators adapted to cooperate with said needles and said sinkers, each separator having a hook on its upper edge and an inclined face extending from said hook to its front end, and means for advancing and retracting said separators with respect to said needles and sinkers.

2. In a flat knitting machine, a set of frame needles, a set of jack sinkers, a set of dividing sinkers, thread guides, a separator comb having a movable bar, separators mounted to be adjusted on said bar and adapted to cooperate with said needles and said sinkers, and means for advancing and retracting said bar with respect to said needles and sinkers.

3. In a flat knitting machine, a set of frame needles, a set of jack sinkers, a set of dividing sinkers, thread guides, each jack sinker having a plush throat with a downwardly extending vertical edge, each dividing sinker having a throat with a steep upwardly extending upper edge, separators adapted to cooperate with said needles and said sinkers, and means for advancing and retracting said separators with respect to said needles and sinkers.

4. In a flat knitting machine, a set of frame needles, a set of jack sinkers, a set of dividing sinkers, thread guides, each jack sinker having a ground-thread throat, a plush throat above said ground-thread throat which is arranged in front of the ground-thread throat for twice the amount for which the plush loops must be longer than the ground-thread loops, each dividing sinker having a pair of throats one above the other, and a plush hook between the two throats, separators adapted to cooperate with said needles and said sinkers, and means for advancing and retracting said separators with respect to said needles and sinkers.

5. In a flat knitting machine, a set of frame needles, a set of jack sinkers, a set of dividing sinkers, thread guides, separators adapted to cooperate with said needles and said sinkers, each separator having an inclined face at its front end, and means for advancing and retracting said separators with respect to said needles and sinkers.

6. In a flat knitting machine, a set of frame needles, a set of jack sinkers, each jack sinker having a ground-thread throat and a plush throat, a set of dividing sinkers, separators adapted to cooperate with said needles and said sinkers, and means for advancing and retracting said separators with respect to said needles and sinkers.

7. In a flat knitting machine, a set of frame needles, a set of jack sinkers, a set of dividing sinkers, each dividing sinker having a ground-thread throat, a plush hook above said throat, and a forwardly inclined edge above said plush hook, separators adapted to cooperate with said needles and said sinkers, and means for advancing and retracting said separators with respect to said needles and sinkers.

8. In a flat knitting machine, a set of frame needles, a set of jack sinkers, a set of dividing sinkers, thread guides, each jack sinker having a ground-thread throat, a plush throat above said ground-thread throat which is arranged in front of the ground-thread throat for twice the amount for which the plush loops must be longer than the ground-thread loops, each dividing sinker having a pair of throats one above the other, and a hook between the two throats, separators adapted to cooperate with said needles and said sinkers, each separator having a straight upper edge, and an inclined face extending from said upper edge to the lower edge of said separator, and means for advancing and retracting said separators with respect to said needles and sinkers.

MAX NEBEL.